(12) United States Patent
Farid et al.

(10) Patent No.: US 8,991,328 B2
(45) Date of Patent: Mar. 31, 2015

(54) MULTI-DIPPING STATION

(76) Inventors: Kamran Farid, Cheshire, CT (US); Cynthia Mockler, North Haven, CT (US); Ricardo Perez, Broad Brook, CT (US); Carrie Cline, Milford, CT (US)

( * ) Notice: Subject to any disclaimer, the term of this patent is extended or adjusted under 35 U.S.C. 154(b) by 176 days.

(21) Appl. No.: 13/558,460

(22) Filed: Jul. 26, 2012

(65) Prior Publication Data

US 2014/0030399 A1 Jan. 30, 2014

(51) Int. Cl.
*B05C 3/05* (2006.01)
*A23G 3/34* (2006.01)
*A23G 3/24* (2006.01)
*A23L 1/212* (2006.01)
*A23P 1/08* (2006.01)
*B05B 13/02* (2006.01)
*B05C 3/09* (2006.01)

(52) U.S. Cl.
CPC ............. *A23P 1/084* (2013.01); *A23G 3/0093* (2013.01); *A23G 3/24* (2013.01); *A23L 1/2125* (2013.01); *B05B 13/0285* (2013.01); *B05C 3/05* (2013.01); *B05C 3/09* (2013.01)
USPC .................. 118/30; 118/13; 118/14; 118/22; 118/31; 99/419; 99/421 R; 99/421 HV

(58) Field of Classification Search
CPC ........ B05C 3/05; A23P 1/084; A23G 3/0093; A23G 3/24; A23G 3/28; A23L 1/2125; A23B 7/16; Y10S 118/06
USPC ........... 118/13, 14, 22, 30, 31, 423, 428, 429; 99/419, 421 R, 421 HV
See application file for complete search history.

(56) References Cited

U.S. PATENT DOCUMENTS

| 98,615 | A | * | 1/1870 | Murdock et al. | 118/31 |
|---|---|---|---|---|---|
| 762,978 | A | * | 6/1904 | Baessler | 118/31 |
| 1,396,458 | A | * | 11/1921 | Ordine | 118/503 |
| 1,911,875 | A | * | 5/1933 | Linton | 426/383 |
| 2,695,590 | A | * | 11/1954 | Zuercher | 118/29 |
| 6,689,406 | B2 | * | 2/2004 | Kuehl et al. | 426/303 |
| 2012/0148715 | A1 | * | 6/2012 | Dupr | 426/302 |

* cited by examiner

*Primary Examiner* — Laura Edwards

(57) ABSTRACT

A system for coating fruit with a substance utilizing a vat that stores a coating substance which can be applied via a dipping process. A dipping cover having a rim is provided for engaging an upper rim of the vat. A dipping tray carries a plurality of fruit items and includes a plurality of receptacles for carrying the fruit items. The dipping tray has a profile smaller than the interior of the vat allowing the dipping tray to be lowered so that the coating substance contained within the interior of the vat may engage the fruit. The dipping cover is configured for supporting the dipping tray in an elevated position once the fruit has been coated allowing excess coating to be vibrated off the dipped fruit.

16 Claims, 8 Drawing Sheets

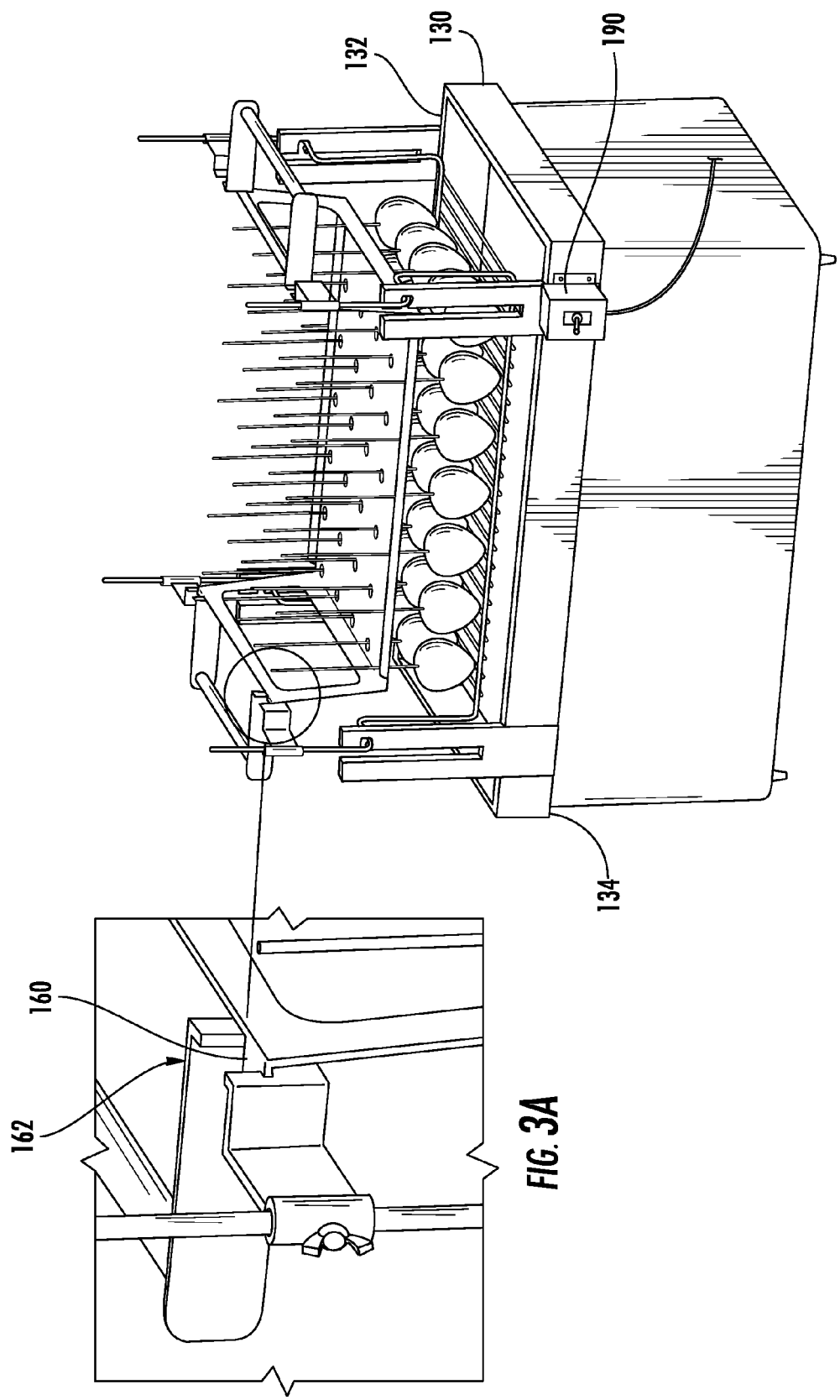

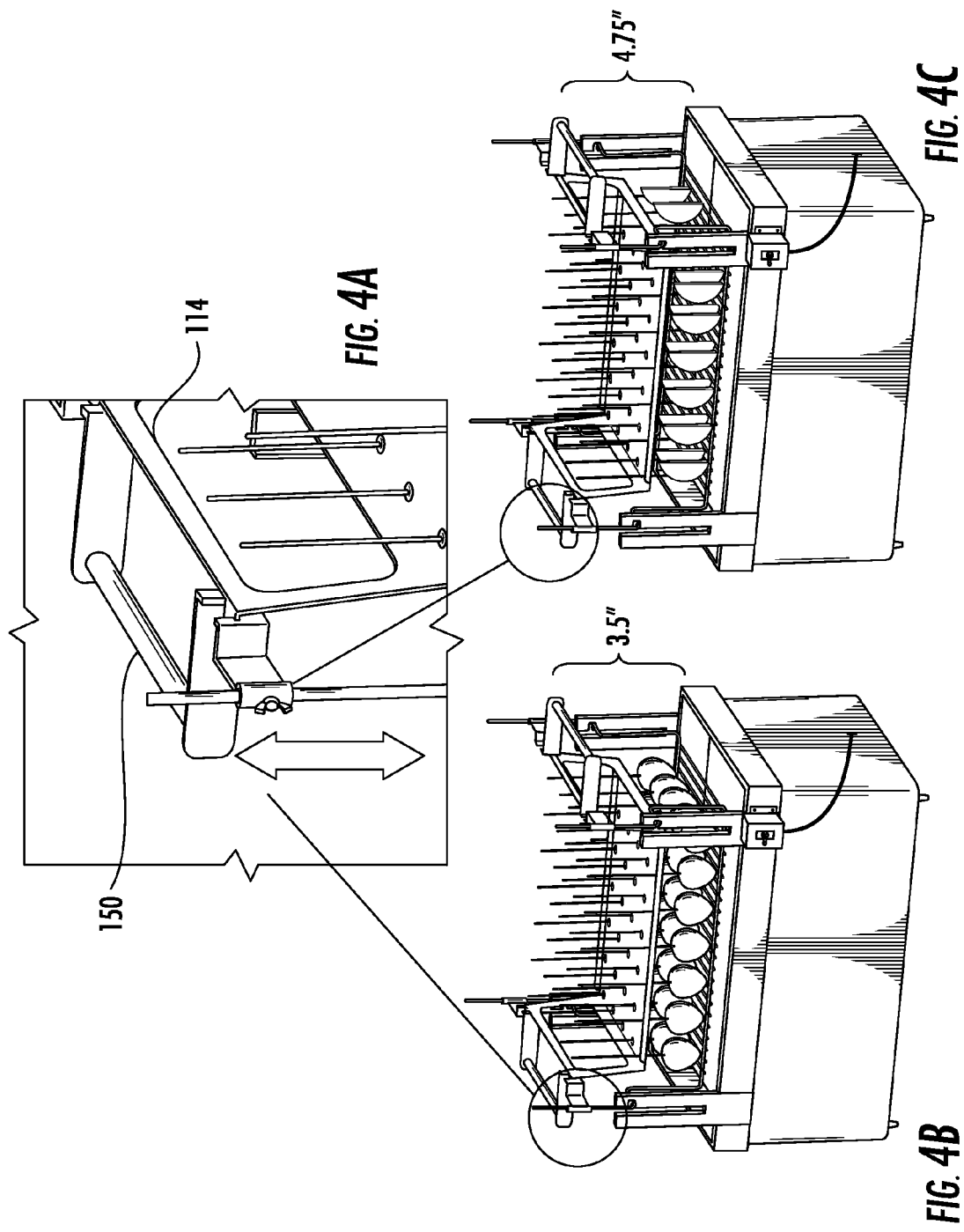

US 8,991,328 B2

MULTI-DIPPING STATION

The present invention relates to the industry which prepares fruit arrangements for special occasions and more particularly to a system and method for dipping multiple fruit specimens simultaneously.

BACKGROUND

The creation of fruit into decorative arrangements has been pioneered by Edible Arrangements Inc. These arrangements are colorful, festive and appealing to the eye. By being comprised of fruit, they are also edible and fun to experience. These arrangements have become extremely popular as a substitute for floral arrangements given for special occasions such as holidays, Valentine's Day, birthdays and the like. However, these arrangements are more than a "fruit basket" comprising an assembly of fruit, such arrangements have special appearances which mimic flowers such as daisies and the like. These clever designs present an eye appeal which renders the arrangements as fruit representing art.

The preparation of the fruit into suitable configurations for assembly into arrangements has become a specialized task. Many hours of creativity has been required in order to develop methods of processing fruit which can be done in a manner which is easily replicated for consistent application among franchisees of such business for maintaining the good will of the business.

The popularity of such fruit arrangements places undue burden on the businesses as multiple orders need to be filled. As the arrangements are personally made by hand, such arrangements require extensive amounts of time to prepare. The time required to prepare the fruit arrangements sometimes becomes problematic when exceptionally large volumes of orders for these distinctive bouquets are place on special occasions such as Valentine's Day and Mother's Day. On these particular events the craftsman are required to produce exceptionally large volumes of these displays which becomes very time consuming. Hence, a need arises for a system which enables a large volume of particular fruit components of fruit arrangements to be processed in a timely and consistent manner.

It is an object of the present invention to provide for an apparatus which enables the mass production of a fruit component for a fruit arrangement in a timely and consistent manner.

SUMMARY

A system for coating fruit with a substance utilizing a vat that stores a coating substance which can be applied via a dipping process. A dipping cover having a rim is provided for engaging an upper rim of the vat. A dipping tray carries a plurality of fruit items and includes a plurality of receptacles for carrying the fruit items. The dipping tray has a profile smaller than the interior of the vat allowing the dipping tray to be lowered so that the coating substance contained within the interior of the vat may engage the fruit. The dipping cover is configured for supporting the dipping tray in an elevated position once the fruit has been coated allowing excess coating to be vibrated off the dipped fruit.

BRIEF DESCRIPTION OF THE DRAWINGS

For a fuller understanding of the invention, reference should be made to the following detailed description, taken in connection with the accompanying drawings, which are not drawn to scale, in which:

FIG. 3A is a close up view illustrating the holding tray carried by a dipping frame according to the present invention;

FIG. 3B illustrates the holding tray presenting a plurality of fruit specimens for coating according to the present invention;

FIG. 4A illustrates the dipping frame having an adjustable height for providing different configurations for dipping fruit specimens of different sizes;

FIG. 4B illustrates the dipping frame in position for presenting a first fruit specimen like strawberries into the coating reservoir according to the present invention;

FIG. 4C illustrates the dipping frame in position for presenting a second fruit specimen like apples which are larger than strawberries into the coating reservoir according to the present invention;

DETAILED DESCRIPTION

Figure 1:
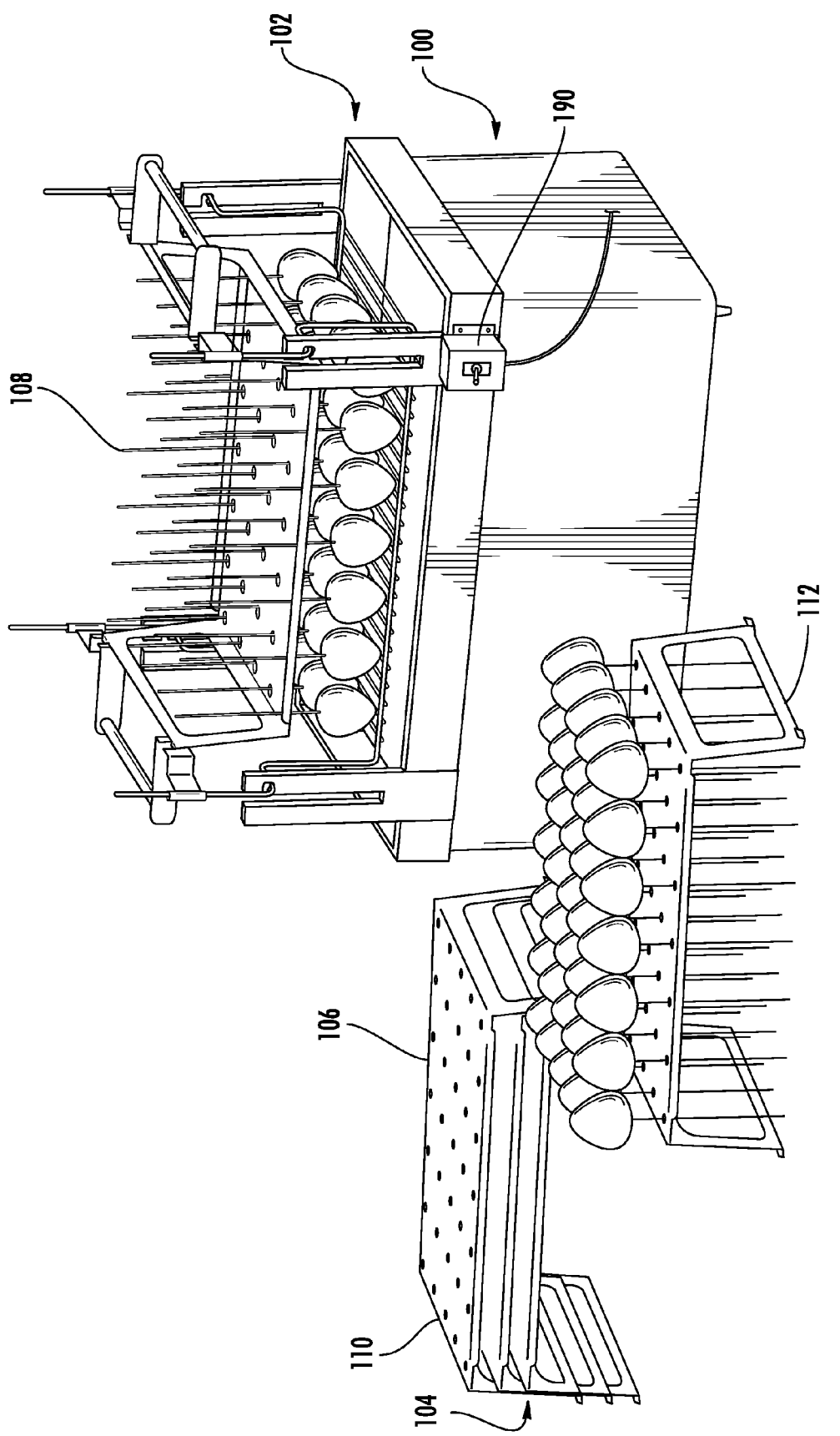
FIG. 1 illustrates the apparatuses for utilization in coating a plurality of fruit specimens simultaneously for incorporation into fruit arrangements according to the present invention.

As required, exemplary embodiments of the present invention are disclosed herein. These embodiments are meant to be examples of various ways of implementing the invention and it will be understood that the invention may be embodied in alternative forms. The figures are not to scale and some features may be exaggerated or minimized to show details of particular elements, while related elements may have been eliminated to prevent obscuring novel aspects. Therefore, specific structural and functional details disclosed herein are not to be interpreted as limiting, but merely as a basis for the claims and as a representative basis for teaching one skilled in the art to variously employ the present invention.

As shown in FIGS. 1-7, a multitude of fruit specimens such as strawberries are processed through the multi-dipping mechanism. Other fruits may include apples, bananas, pineapples, or melons. The multi-dipping system preferably includes a food warmer dipping vat 100 commonly available from Server Products, www.server-products.com, which is designed for warming dipping or coating substances such as chocolate. The dipping vat includes a general housing which defines an interior for storing the dipping coating. An upper rim 102 defines an opening which communicates with and provides access to the interior enabling the fruit to be presented to the dipping coating and removed.

As shown in FIGS. 1 and 2A-2C, the multi-dipping system utilizes a dipping tray 104 which has a plurality of holes 106 configured in an array for receiving skewers 108. The array is designed to enable the fruit specimens to have spacing between then allowing the coating to pass onto all sides of the respective fruit specimens. In the embodiment shown, seven rows of five holes are presented allowing for thirty-five pieces of fruit to be simultaneously coated. The dipping try 104 preferably includes an elevated platform 110 which carries the respective holes. The platform is carried by a first and second pedestal 112 located on opposing sides of the platform. The pedestal may be a singular leg or as shown in the drawings a configuration which includes two legs positioned on corners of the platform and connected with a base support. A space is defined underneath the raised platform and the base of the respective legs which provides for clearance of the skewers when the fruit specimens are positioned within the holes. The skewers are utilized as a mechanism for transitioning the fruit from the dipping tray and for incorporation into a respective fruit arrangement. In this manner the length of the skewers it greater than the height of the legs enabling a portion of the skewers to be present above the platform providing for a gripping surface to remove the skewers and also separation of the fruit from the platform should the entire fruit be desired fully coated.

Figure 2A:
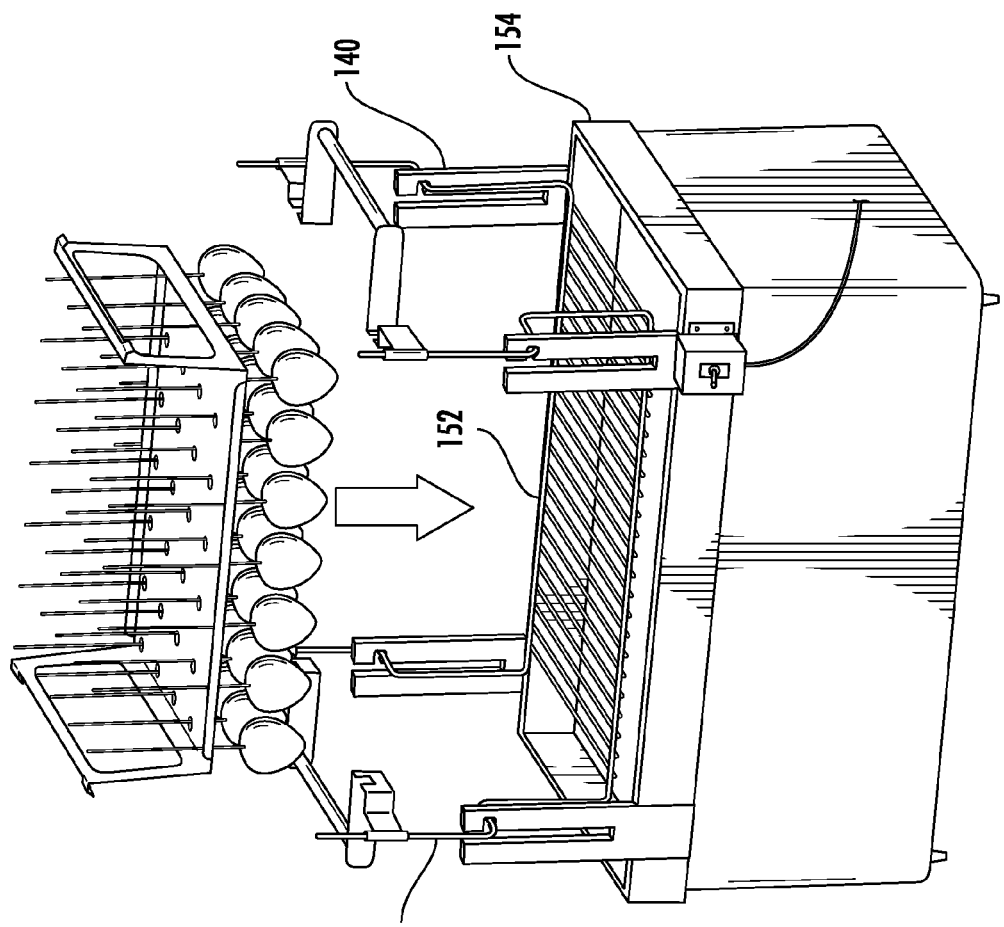
FIG. 2A is an exploded view of the apparatuses for utilization in coating a plurality of fruit specimens simultaneously for incorporation into fruit arrangements according to the present invention.
Figure 2B:
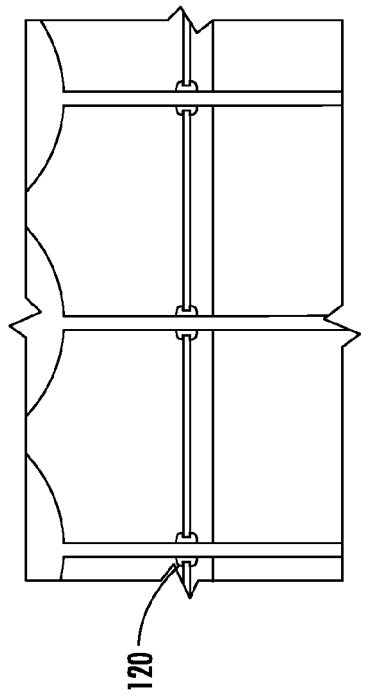
FIG. 2B is an illustrative view of a plurality of strawberries positioned on skewers carried by a holding tray in position for placement into the coating apparatus.
Figure 2C:
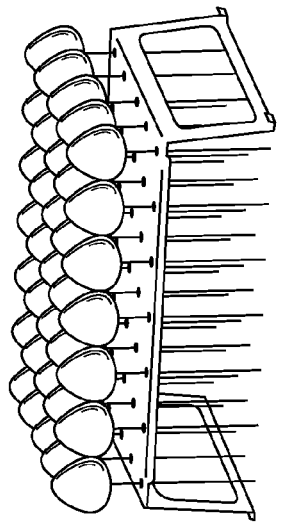
FIG. 2C is a sectional view illustrating respective skewers being held in releasable frictional engagement with a holding tray according to the present invention.

As shown in close-up in FIG. 2C grommets 120 are positioned within the respective holes to provide a frictional surface for retaining the respective skewers in position when placed within the respective holes. As shown in FIG. 2B the dipping tray is positioned on the ground with the legs engaging the ground when the fruit specimens are positioned in the tray prior to being dipped into the dipping station. As shown in FIG. 2A, the dipping tray is inverted for presenting the respective fruit specimens into the dipping vat for being covered by the dipping substance. In this dipping configuration the grommets secure the skewers in place enabling the respective fruit specimens to be presented "head first" into the dipping vat.

As shown in FIGS. 2A, 3A and 3B, a dipping collar 130 is adapted for being attached to the upper rim of the dipping vat. The dipping collar has a lip 132 and downwardly extending sidewalls 134 which preferably contact the respective sidewalls of the vat providing for a secure "cap" of the dipping vat. The lip 132 defines a central opening for communicating with the interior of the dipping vat enabling fruit to pass through the profile created by the cap and into the interior of the dipping vat for engaging the coating substance.

As shown in FIGS. 2A, 3A and 3B the dipping collar includes a plurality of upwardly extending dipping tray supports 140. Preferably dipping tray supports 140 are positioned in the proximity of the corners of the dipping vat.

As shown in FIGS. 2A, 3A, 3B, 4A and 8, dipping tray 104 is preferably carried by a retention rack 150 during the dipping process. Retention rack 150 includes a plurality of offset horizontal wire arms 152 which are attached to perpendicularly oriented side arms 154 which preferably are bent upwards to a height greater than the height of the fruit specimens carried by the dipping tray and legs of the dipping tray. In this manner the retention rack may carry the dipping tray in a manner such that when the dipping tray is in position for dipping within the respective vat, the upside down fruit specimens are positioned above the wire arms of the retention rack enabling the dipping substance to pass over the wire arms of the retention rack and be deposited on the respective fruit specimens. In one embodiment, the dipping tray includes a plurality of tabs 160 which extend from the base of the respective legs in a general horizontal direction. The retention rack preferably includes a plurality of seats 162 disposed at an upper end of the retention rack for receiving the tabs 160 of the dipping tray. In this manner the dipping tray may be carried in an elevated position above the horizontal arms of the retention rack enabling the horizontal arms to function as a safety catcher and catch any fruit specimen which may inadvertently come loose from the dipping tray during the dipping process. The combination of the retention rack and dipping tray forms a dipping assembly. Additionally, the retention rack includes a plurality of handles 172 enabling for the easy movement of the dipping assembly when the dipping tray is carried by the retention rack.

Figure 5A:
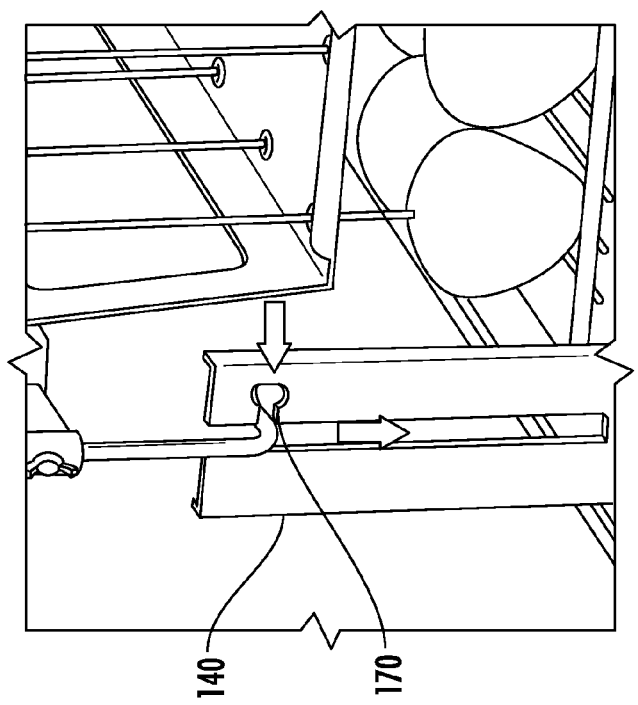
FIG. 5A illustrates a close up view of a locking mechanism of the dipping frame to retain the holding tray in an elevated position according to the present invention.
Figure 5B:
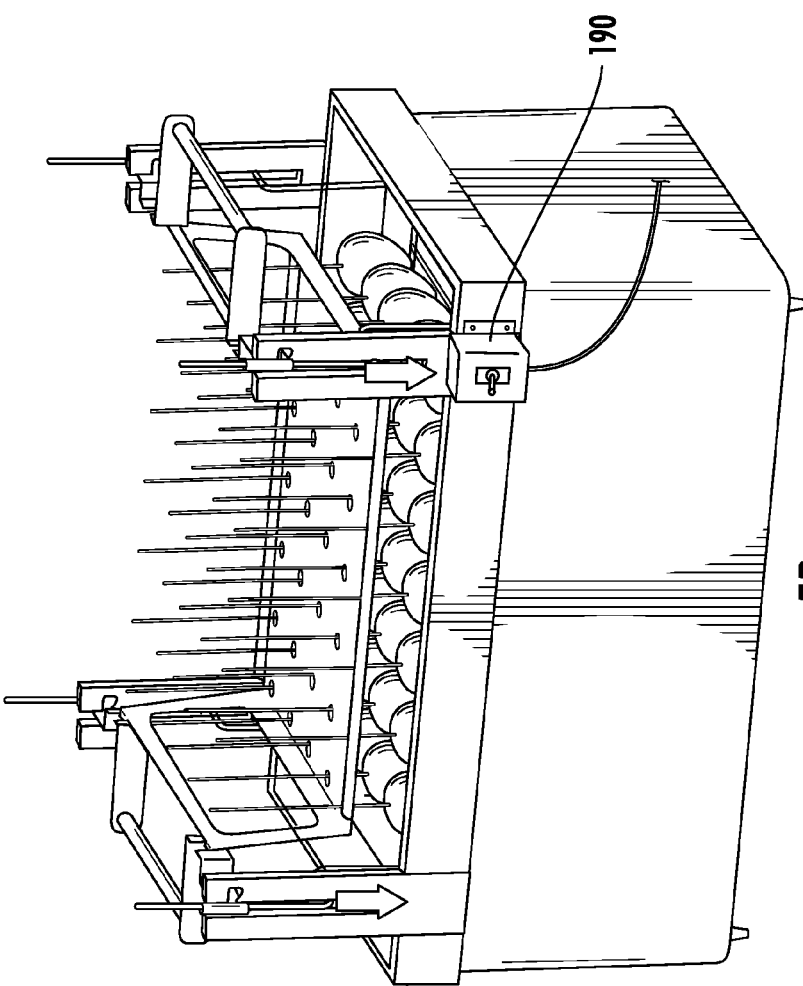
FIG. 5B illustrates the holding tray in position for dipping the fruit specimens.
Figure 6:
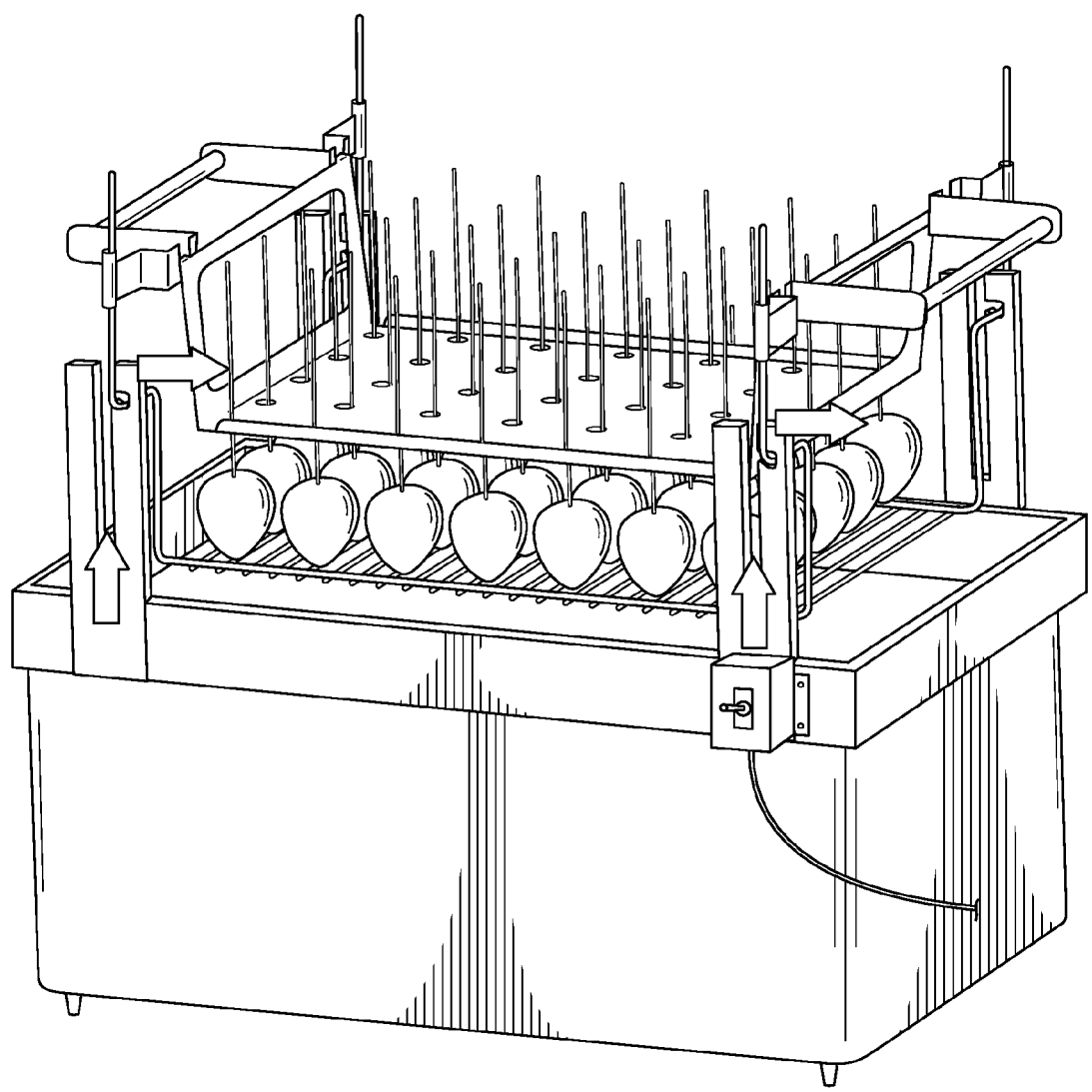
FIG. 6 illustrates the holding tray in an elevated, supported position after the fruit specimens have been coated enabling excess coating from the fruit specimens to be agitated off of the fruit specimens according to the present invention.
Figure 7:
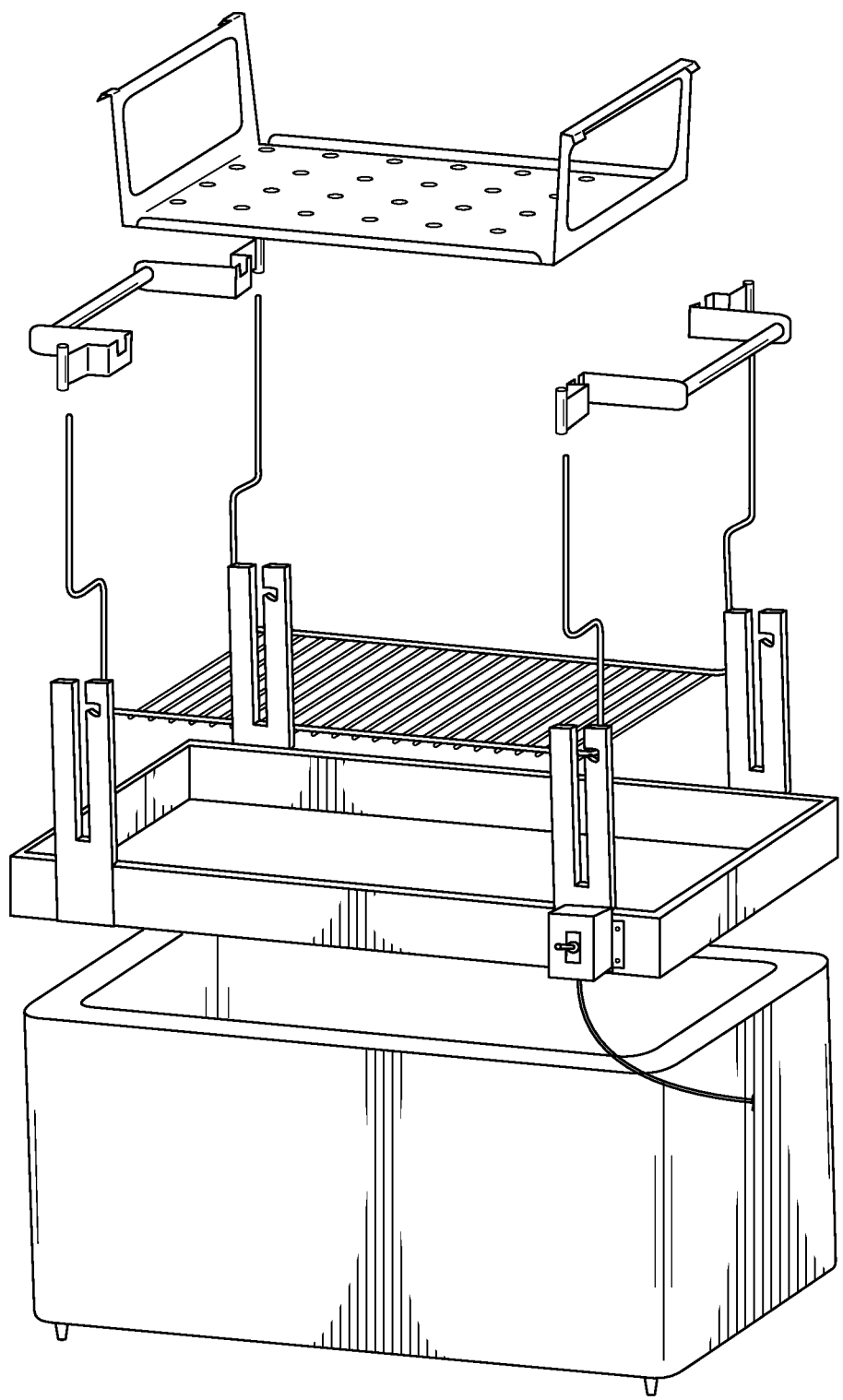
FIG. 7 is an exploded view of the components of the coating apparatus according to the present invention.
Figure 8:
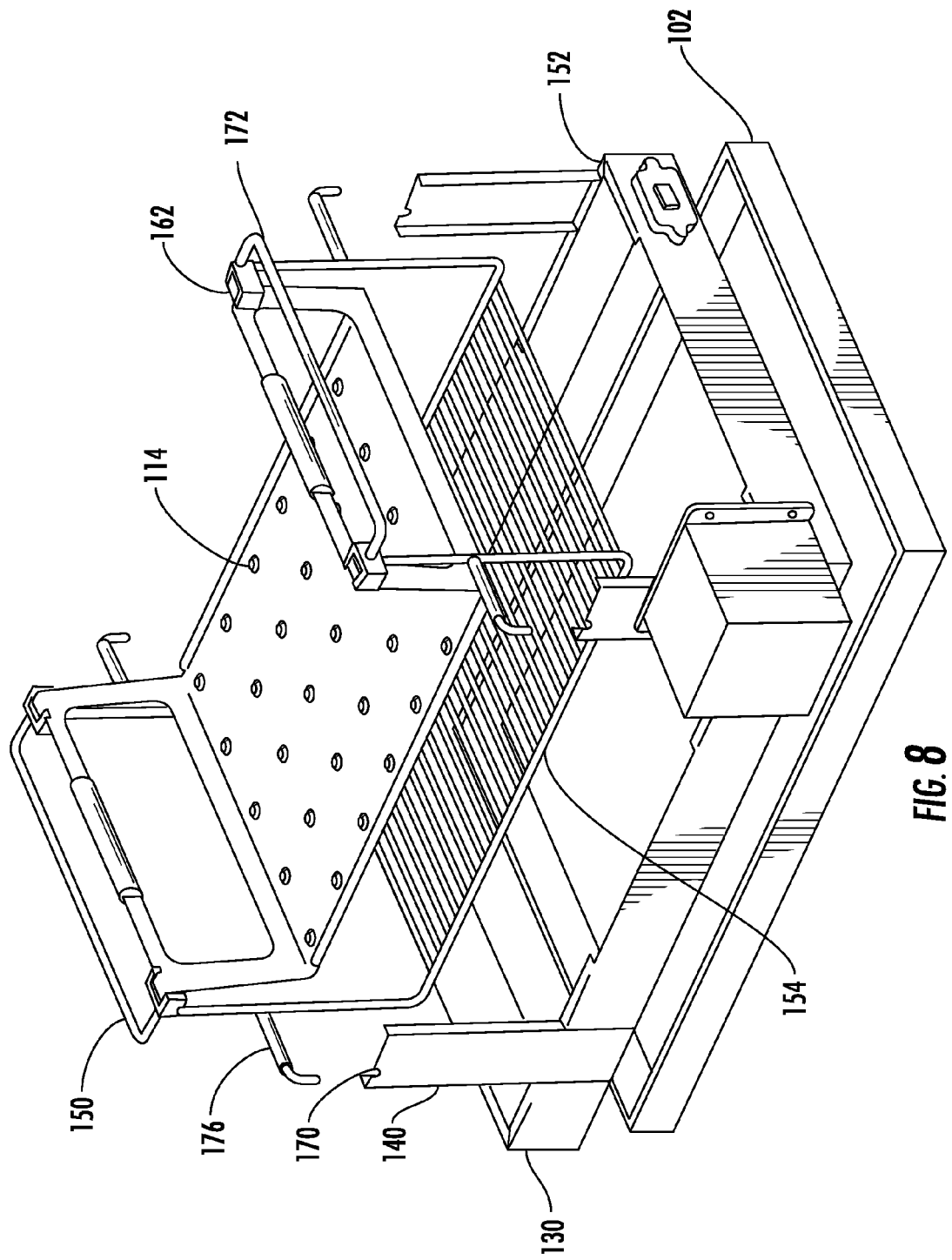
FIG. 8 is an alternative embodiment of the present invention.

As shown in FIGS. 5A, 5B and 8, the upwardly dipping tray supports 140 of dipping collar 130 include a retaining member 170 for retaining dipping tray 114 in an elevated position above the interior of the dipping vat. In the preferred embodiment the retaining member 170 is a notch formed within the upwardly extending leg for receiving either a portion of the retention member or an appendage 176 carried by the retention rack.

As shown in FIG. 5B, the retention rack carrying the dipping tray is removed from the respective retaining member 170 and is lowered for presenting the fruit into the coating substance in a dipping manner. In one embodiment, the respective dipping tray supports 140 include a central channel 175 enabling the passing of the retention rack from an elevated retained position to a lowered position suitable for presenting the respective fruit specimens to the coating substance. As shown in FIG. 8, an alternative embodiment includes the retention rack 150 having a length which is shorter than the interior space 180 defined by the dipping collar so the retention rack 150 is offset from the respective edges of the dipping collar. This offset enables the retention rack 150 to be removed from the respective retaining member 170 in a lateral direction while still being presented over the interior of the dipping vat for lowering. Upon removal from the coating substance the appendages 176 of the retention rack would be positioned on the respective retaining member 170.

As shown in FIGS. 1, 2A, 3B, 4B, 5B, 6, 7 and 8 an electronic vibrating device 190 is utilized for vibrating the dipping collar and subsequently the retention rack and the dipping tray 140. The vibrating device preferably is a shaker which oscillates providing for sufficient vibration to shake access coating from the respective dipped fruit while the fruit is suspended above the dipping vat after the fruit has been dipped and is covered with the respective coating. The vibrating device 190 includes an Off/On control so that it is operable only when desired which is when the fruit is initially coated and suspended above the dipping vat. The vibrating device will vibrate the respective fruit skewers and fruit providing for a clean process for removing access coating from the fruit. The retention rack ensures that should the vibration disengaged any respective skewer from its respective frictional engagement with the holes in the dipping tray, the fruit will be caught by the arms of the wire rack above the dipping substance thereby still ensuring a "clean" coated product.

Once the required time for vibrating the components and fruit has passed the vibrations are ceased and the dipping tray is lifted from the retention rack and flipped over so that the legs of the dipping tray rest on a surface as shown in FIG. 1. In this manner the coating layer is allowed to cool and harden on the respective fruit. The skewers are preferably longer than the respective legs of the dipping tray so they may also engage the surface when the legs of the dipping tray rest on the surface and also include an additional length which elevates the dipped fruit above the tray's platform providing access to the skewer and removal from the dipping tray once the coating substance has cooled.

Accordingly, it may be seen that an advantageous system for dipping a multitude of fruit specimens simultaneously may be had in an efficient and clean manner according to the present invention. A dipping tray is provided which has openings defined within a horizontal platform in an array in both a lateral and longitudinal arrangements enabling a plurality of fruit specimens being carried by skewers or the like to be received within the array for subsequent dipping. The skewers are maintained in frictional engagement with the openings enabling for the easy removal of the fruit from the dipping station by removal of the respective skewers. A dipping cover engages the upper portion of a dipping vat which contains a coating substance which the fruit will be dipped into. The dipping cover includes an elevated support for retaining the dipping tray in an elevated position. When dipping is desired the dipping tray is lowered into the dipping vat and removed and positioned onto the elevated supports of the dipping cover which maintains the dipped fruit over the interior of the dipping vat. In this position the dipping tray is agitated to shake off any excess coating and the dipping tray is positioned in a manner such that the excess coating is deposited back into the interior of the dipping vat eliminating waste and maintaining a clean station. Once the excess coating has been removed, the dipping tray is flipped over and positioned onto a surface until the coating is cooled.

We claim:

1. A system for coating a plurality of fruit items simultaneously comprising:
    at least one skewer for holding at least one fruit item;
    a vat having a general housing defining an interior for retaining a coating substance and an upper rim defining an opening communicating with said interior;
        a dipping cover having a rim for engaging said upper rim of said vat, said rim defining an opening communication with the opening of said vat, said dipping cover including a plurality of vertical extensions;
        a dipping tray for carrying a plurality of skewers, said dipping tray including a plurality receptacles for carrying said skewers, said skewers held in frictional engagement with said receptacles;
        said dipping tray having a profile smaller than said interior of said vat and said dipping cover enabling said fruit items carried by said dipping tray to engage the coating substance contained within the interior of said vat;
        said dipping tray configured for being carried by said vertical extensions of said dipping cover in an elevated position over said interior of said vat enabling excess coating to be vibrated off of said fruit items into said interior of said vat once said fruit items have been coated; and
        said dipping tray having a plurality of legs enabling said dipping tray to be positioned on a surface once said fruit specimens have been coated and excess coating has been removed enabling said coating to harden onto said fruit.

2. The system of claim 1 further including a retention rack integrated with said dipping tray defining a dipping assembly for dipping said fruit into said interior of said vat, said retention rack including arms positioned beneath said fruit when said fruit is being dipped into the coating substance contained within said vat interior and when said dipping assembly is removed from said coating substance for capturing any fruit which may fall from said dipping tray.

3. The system of claim 2 wherein said retention rack includes a plurality of receptacles for receiving portions of said dipping tray enabling said retention rack and dipping tray to become integrated so movement of one simultaneously moves the other.

4. The system of claim 3 wherein said retention rack includes a plurality of seats and said dipping tray includes a plurality of tabs for being positioned within said seats thereby integrating the two components so movement of one simultaneously moves the other.

5. The system of claim 2 wherein said vertical extensions of said dipping cover include a receptacle for receiving a portion of said dipping assembly for maintaining said dipping assembly in an elevated position above the interior of said vat enabling excess coating to fall into said vat interior.

6. The system of claim 5 wherein said vertical extensions include a notch for receiving a portion of said dipping assembly and wherein said retention rack is received within said notch for maintaining said dipping tray elevated above said interior of said vat.

7. The system of claim 1 further including a shaking mechanism for oscillating said dipping tray when carried by said vertical extensions of said dipping collar enabling excess coating on said fruit to be displaced from the fruit.

8. The system of claim 7 wherein said shaking mechanism is a vibrating mechanism which is carried by said dipping collar for imputing oscillating movement onto said dipping tray.

9. The system of claim 1 wherein said dipping tray includes a plurality of openings for receiving skewers carrying fruit specimens.

10. The system of claim 9 further including grommets retained within said openings for providing frictional engagement with said skewers for retaining said skewers in said openings when said dipping tray is turned upside down presenting said fruit specimens to the interior of said vat.

11. A system for coating fruit with a substance utilizing a vat having a housing defining an interior for housing a liquid substance for coating the fruit, the housing including an upper rim defining an opening communicating with the interior of the vat comprising:
    at least one skewer for holding at least one fruit item;
    a dipping cover having a rim for engaging said upper rim of said vat, said rim defining an opening communication with the opening of said vat, said dipping cover including a plurality of vertical extensions;
    a dipping tray for carrying a plurality of skewers, said dipping tray including a plurality receptacles for carrying said skewers, said skewers held in frictional engagement with said receptacles;
    said dipping tray having a profile smaller than said interior of said vat and said dipping cover enabling said fruit items carried by said dipping tray to engage the coating substance contained within the interior of said vat;
    said dipping tray configured for being carried by said vertical extensions of said dipping cover in an elevated position over said interior of said vat enabling excess coating to be vibrated off of said fruit specimens into said interior of said vat once said fruit specimens have been coated;
    said dipping tray having a plurality of legs enabling said dipping tray to be positioned on a surface once said fruit specimens have been coated and excess coating has been removed enabling said coating to harden onto said fruit; and
    a shaking mechanism for oscillating said dipping tray when carried by said vertical extensions of said dipping collar enabling excess coating on said fruit to be displaced from the fruit.

12. The system of claim 11 further including a retention rack integrated with said dipping tray defining a dipping assembly for dipping said fruit into said interior of said vat, said retention rack including arms positioned beneath said fruit when said fruit is being dipped into the coating substance contained within said vat interior and when said dipping assembly is removed from said coating substance for capturing any fruit which may fall from said dipping tray.

13. The system of claim 12 wherein said retention rack includes a plurality of receptacles for receiving portions of said dipping tray enabling said retention rack and dipping tray to become integrated so movement of one simultaneously moves the other.

14. The system of claim 13 wherein said retention rack includes a plurality of seats and said dipping tray includes a plurality of tabs for being positioned within said seats thereby integrating the two components so movement of one simultaneously moves the other.

15. The system of claim 12 wherein said vertical extensions of said dipping cover include a receptacle for receiving a portion of said dipping assembly for maintaining said dipping assembly in an elevated position above the interior of said vat enabling excess coating to fall into said vat interior.

16. The system of claim 15 wherein said vertical extensions include a notch for receiving a portion of said dipping assembly and wherein said retention rack is received within said notch for maintaining said dipping tray elevated above said interior of said vat.

* * * * *